(12) United States Patent
Sloan

(10) Patent No.: US 9,951,234 B1
(45) Date of Patent: Apr. 24, 2018

(54) EXTENDER AND ADHESION PROMOTER

(71) Applicant: Donald D. Sloan, Platte City, MO (US)

(72) Inventor: Donald D. Sloan, Platte City, MO (US)

(73) Assignee: Donald D. Sloan, Platte City, MO (US), Trustee of the Donald D. Sloan Trust, and His Successor and Successors, Under the Fifteenth Amendment to and Complete Restatement of the Donald D. Sloan Trust dated Dec. 17, 2013

( * ) Notice: Subject to any disclaimer, the term of this patent is extended or adjusted under 35 U.S.C. 154(b) by 0 days.

(21) Appl. No.: 15/455,332

(22) Filed: Mar. 10, 2017

(51) Int. Cl.
*C09D 11/03* (2014.01)
*C09D 11/38* (2014.01)
*C09D 7/12* (2006.01)

(52) U.S. Cl.
CPC ......... *C09D 7/1283* (2013.01); *C09D 7/1291* (2013.01); *C09D 11/03* (2013.01)

(58) Field of Classification Search
CPC ...... C09D 11/03; C09D 11/38; C09D 7/1283; C09D 7/1291
USPC ...................................... 106/31.95
See application file for complete search history.

(56) References Cited

U.S. PATENT DOCUMENTS

| | | | | | |
|---|---|---|---|---|---|
| 4,920,002 | A | * | 4/1990 | Cussot | C09D 7/1283 428/220 |
| 5,017,207 | A | * | 5/1991 | Watkinson | C03B 37/005 264/5 |
| 6,086,795 | A | * | 7/2000 | Hatton | C09J 11/06 252/301.21 |
| 6,127,037 | A | * | 10/2000 | Sargeant | B41M 5/52 347/105 |
| 6,197,377 | B1 | * | 3/2001 | Boogaard | C09D 7/1283 427/299 |
| 6,482,519 | B1 | * | 11/2002 | Schleifstein | C09D 7/1291 428/402 |
| 7,427,317 | B2 | | 9/2008 | Sloan | |
| 7,431,759 | B2 | | 10/2008 | Sloan | |
| 7,662,224 | B2 | | 2/2010 | Sloan | |
| 8,092,003 | B2 | | 1/2012 | Sloan | |
| 8,263,694 | B1 | * | 9/2012 | Warren | C08G 18/0819 524/432 |
| 8,742,004 | B1 | | 6/2014 | Sloan | |
| 9,234,108 | B1 | * | 1/2016 | Sloan | C09D 11/322 |
| 9,453,301 | B2 | * | 9/2016 | Sloan | D06P 3/00 |
| 2003/0013801 | A1 | * | 1/2003 | Sieber | C09D 133/08 524/560 |
| 2003/0018118 | A1 | * | 1/2003 | Burnett | C09D 7/1283 524/494 |
| 2008/0287574 | A1 | * | 11/2008 | Loth | C09D 7/1283 524/35 |
| 2012/0046378 | A1 | | 2/2012 | Sloan | |
| 2013/0131211 | A1 | | 5/2013 | Sloan | |

OTHER PUBLICATIONS

Xama 7 Data Sheet, http://www.ichemco.it/docforn/XAMA7_BE.pdf, Nov. 2004; 2 pages.*
PZ-33 Spec Sheet, https://polyaziridine.com/wp-content/uploads/2014/12/PZ-33-Spec-Sheet.pdf, no date available; 1 page.*

* cited by examiner

*Primary Examiner* — Helene Klemanski
(74) *Attorney, Agent, or Firm* — Hovey Williams LLP

(57) ABSTRACT

A coating-extender and adhesion-promoting composition is provided that comprises a plurality of glass particles having an adhesion-promoting compound deposited thereon. Various coatings, especially inks, can be formulated with the coating-extender composition so as to reduce the coating's requirements of more expensive components such as monomers, oligomers, resins, and pigment.

22 Claims, No Drawings

EXTENDER AND ADHESION PROMOTER

BACKGROUND OF THE INVENTION

Field of the Invention

The present invention is generally directed toward an extender and adhesion-promoting composition useful in coatings, especially inks. The composition can be used to take the place of monomers, oligomers, resins, or other more expensive components of a coating system without meaningfully affecting the performance characteristics of the system. In addition, compositions according to the present invention may also comprise an adhesion promoting compound that improves adherence of the coating to the surface to which it is applied.

Description of the Prior Art

Extenders, also known as fillers, are used in printing ink technology to reduce the cost of the ink by increasing the area covered by a given weight of pigment. Extenders are often white transparent, or semi-transparent, components that have little coloring power of their own, and whose transparency in inks is frequently due to their refractive indicies being similar to the ink as opposed to opaque pigments, which are generally much higher. In addition to reducing the cost of the ink, extenders can also impart useful properties to the ink. Extenders can reduce the color strength of the ink without requiring the addition of white pigment. Extenders can also be used to adjust the ink's consistency and viscosity.

In some instances, extenders comprise the base of the ink composition, also referred to as a varnish, but without pigment. While these types of extenders may permit pigment use to be extended, in some applications, the cost of the monomer, oligomer, or resins used in the varnish exceed that of the pigment. However, these varnish components often are directly linked to various physical characteristics of the coating, such as adhesion. Therefore, there is a need in the art for an extender that can be used in lieu of at least a portion of the varnish, but without adversely impacting the essential physical characteristics of the ink.

SUMMARY OF THE INVENTION

According to one embodiment of the present invention there is provided a coating-extender composition comprising a plurality of microsized glass particles having an adhesion-promoting compound adhered thereto. The glass particles having an average particle size of less than 500 microns. The adhesion-promoting compound comprises from about 1% to about 50% by weight, based on the weight of the entire composition.

According to another embodiment of the present invention there is provided a coating composition comprising a coating-extender composition as described herein.

According to yet another embodiment of the present invention there is provided a method of forming a coating-extender composition. The method comprises forming a mixture comprising a quantity of glass particles having an average particle size of less than 500 microns and an adhesion-promoting compound dispersed in an alcohol. The mixture is heated to a temperature of from about 100° F. to about 150° F. for a period of time sufficient to evaporate at least a portion of the alcohol from the mixture to form the coating-extender composition.

DETAILED DESCRIPTION OF THE PREFERRED EMBODIMENT

Coating-extender compositions made in accordance with the present invention generally comprise a plurality of microsized glass particles, which have adhered or deposited onto the surfaces thereof, a quantity of an adhesion-promoting compound. In certain embodiments, the glass particles have an average particle size of less than 500 microns, less than 300 microns, less than 200 microns, less than 100 microns, or less than 50 microns. In other embodiments, the glass particles have an average particle size of from about 1 to about 200 microns, from about 2.5 to about 100 microns, from about 5 to about 50 microns, or from about 7 to about 25 microns. As used herein, the term "average particle size" refers to the number average of the plurality of particles comprising the coating-extender composition. In some embodiments, the glass particles comprise microspheres. In other embodiments, the glass particles comprise flakes. In either case, particle size is understood as referring to the particle's largest dimension. In the case of a sphere, this would be the particle's diameter. In the case of a flake, this would be the particle's dimension about it's longitudinal axis. In certain embodiments according to the present invention, the glass flakes have an average flake or platelet thickness that is less than 5 microns, less than 3 microns, or less than 1.5 microns. The determination of average particle size can be made in accordance with any known method in the art such as dynamic light scattering, microscopy, or sieving. In other embodiments, particularly if the coating-extender composition is to be used in a coating to be applied by an inkjet printer, the glass particles can be milled, such as with a Hockmeyer Immersion Mill, or other type of ball mill, and reduced in size to one micron or less.

One exemplary type of glass particles is SPHERIGLASS 5000 by Potters Industries LLC, Valley Forge, Pa. This particular type of of glass particle is general spherical is shape and has an average (mean value) particle size distribution of from 7-10 microns, a bulk density 80 lb/ft$^3$ (untapped), 101 lb/ft$^3$ (tapped), and oil absorption of 20 g oil/100 spheres (ASTM D-1483). The glass spheres generally have a composition as set forth in Table 1, below.

Another exemplary type of glass particle is GF100M, ECR Glass Flake. GF100M is an extra corrosion resistant glass flake which is manufactured from modified C glass with a nominal thickness of 1.0-1.3 micron. These particles generally have a particle size distribution of: 1000-300 microns (<10%), 300-50 microns (>65%), and <50 microns (<25%). These glass flakes generally have a composition as set forth in Table 1.

TABLE 1

| Component | SPERIGLASS 5000 (amount by wt. %) | GF100M Glass Flake (amount by wt. %) |
|---|---|---|
| $SiO_2$ | 72.5% | 64-70% |
| $Na_2O$ | 13.7% | 8-13% |
| CaO | 9.8% | 3-7% |
| MgO | 3.3% | 1-4% |
| $Al_2O_3$ | 0.4% | 3-6% |
| $FeO/Fe_2O_3$ | 0.2% | — |
| $K_2O$ | 0.1% | 0-3% |
| $B_2O_3$ | — | 2-5% |

TABLE 1-continued

| Component | SPERIGLASS 5000 (amount by wt. %) | GF100M Glass Flake (amount by wt. %) |
|---|---|---|
| ZnO | — | 1-5% |
| TiO$_2$ | — | 0-3% |

The glass particles may also comprise a surface pretreatment, particularly a silane coupling agent. Exemplary silane coupling agents include 3-aminopropyltriethoxy silane, vinyl trimethoxy silane, γ-glycidoxypropyltrimethoxy silane and methacryloxypropyltrimethoxy silane, and mixtures thereof.

The adhesion-promoting compound that is loaded onto the glass particles may be any compound that is characterized by its ability to improve adhesion of a surface coating composition to the substrate to which it is applied. In certain embodiments, the adhesion-promoting compound is used in the crosslinking of monomers, oligomers, and polymer resins that comprise a coating composition. According to one embodiment of the present invention, the adhesion-promoting compound comprises an aziridine crosslinking agent, such as comprises pentaerythritol tris[3-(1-aziridinyl) propionate], which is commercially available as PZ-33, a XAMA 7 equivalent, from PolyAziridine, LLC, Medord, N.J.

In certain embodiments, the adhesion promoting compound comprises from about 1% to about 50%, from about 5% to about 40%, from about 10% to about 30%, or from about 15% to about 25% by weight of the total coating-extender composition.

The coating-extender composition is generally made by first forming a mixture comprising a quantity of any of glass particles described previously and an adhesion-promoting compound dispersed in an alcohol. In certain embodiments, the alcohol comprises ethyl alcohol, but any suitable alcohol capable of forming a relatively stable dispersion with the adhesion-promoting compound can be used. Preferably, the alcohol will also have a sufficiently high vapor pressure so as to permit it to be readily evaporated from the mixture once the glass particles have been sufficiently contacted with the adhesion-promoting compound. In certain embodiments, the adhesion-promoting compound may be reactive with water, thus it may be preferable to avoid the use of aqueous systems in which to disperse the adhesion-promoting compound and glass particles.

In certain embodiments, the mixture comprises from about 20% to about 45%, from about 25% to about 40%, or from about 30% to about 35% by weight of the glass particles. In certain embodiments, the mixture comprises from about 5% to about 30%, from about 10% to about 25%, or from about 15% to about 20% by weight of the adhesion-promoting compound. In certain embodiments, the mixture comprises from about 40% to about 65%, from about 45% to about 60%, or from about 50% to about 55% by weight of said alcohol.

The mixture is stirred or otherwise mixed together for a sufficient period of time to coat the surfaces of glass particles with the adhesion-promoting compound/alcohol mixture. In certain embodiments, this mixing operation can be conducted at ambient temperature under low mixer speeds. Upon completion of adequate mixing, the mixture is then dried so as to evaporate at least a portion, and preferably a majority, and most preferably most, of the alcohol contained in the mixture thereby forming a relatively dry-powder product comprising the glass particles coated with the adhesion-promoting compound.

In certain embodiments, the mixture may be subjected to an extraction step in order to separate at least a portion of the alcohol and possibly some excess adhesion-promoting compound therefrom. As fine filters may need to be employed in the extraction step order to retain glass particles of small particle sizes, this filtering can occur with vacuum assist in order to more quickly process the mixture.

In certain embodiments, either subsequent to or in place of the extraction step, the mixture may be heated, such as in an oven, for a period of time sufficient to evaporate at least a portion of the alcohol from the mixture. In particular embodiments, the mixture is heated to a temperature of at least 100° F., at least 110° F., at least 125° F., or at least 135° F. In other embodiments the mixture is heated at a temperature of from about 100° F. to about 150° F., from about 115° F. to about 140° F., or from about 120° F. to about 130° F. The heating step may be conducted for a period of from about 30 minutes to about 48 hours, from about 1 hour to about 24 hours, or from about 6 hours for about 20 hours to ensure adequate evaporation of the alcohol residues contained within the mixture.

The coating-extender composition can be used in the formulation of a number of coating compositions in place of a certain amount of monomers, oligomers, resins, and/or pigments that might otherwise be required. In certain embodiments, the coating-extender composition comprises from about 1% to about 20%, from about 2.5% to about 17.5%, from about 5% to about 15%, or from about 7.5% to about 12.5% by weight of the coating composition. In particular embodiments, especially when the coating composition is formulated using a varnish comprising one or more monomers, oligomers, resins or reactive diluents, the coating-extender can be used in place of at least a portion of the varnish.

The coating-extender composition can be used in the formulations of nearly any type of coating, but especially ink systems. The coatings can be formulated for application by numerous means including screen printing, roller coating, and spraying. In certain embodiments, the coating-extender composition can be used in the formulation of digital ink compositions (i.e., for application via an inkjet printer); however, in such embodiments care must be taken to utilize glass particles having an average particle size of one micron or less so as to reduce the potential for clogging of the nozzles of the inkjet heads. Exemplary ink compositions that may be modified to include the coating-extender composition of the present invention are disclosed in U.S. Pat. Nos. 7,427,317, 7,431,759, 7,662,224, 8,092,003, and 8,742,004, and U.S. Patent Application Publication Nos. 2012/0046378 and 2013/0131211, which are incorporated by reference herein in their entireties. The ink formulations disclosed in these references may be modified so as to replace at least a portion of the monomer, oligomer, resins, and/or pigments contained therein with an amount of the coating-extender composition.

In certain embodiments, the coatings comprising the coating-extender composition include at least one member selected from the group consisting of: (a) one or more monomers; (b) one or more oligomers; (c) one or more polymer resins; (d) one or more reactive diluents; and (e) one or more photoinitiators. In certain embodiments, the coating may comprise amounts of one, two, three, four, or all five of such components.

The coating-extender composition may be utilized in coating systems comprising from about 5% to about 80%, from about 10% to about 70%, or from about 15% to about 60% by weight of one or more monomers. The monomers may be monofunctional, difunctional, or trifunctional in nature. In particular embodiments, the monomers will be acrylate monomers such as methyacrylate, 2-phenoxylethyl acrylate, isobornyl acrylate, and combinations thereof.

The coating-extender composition may be utilized in coating systems comprising from about 5% to about 50%, from about 10% to about 45%, or from about 15% to about 40% by weight of one or more oligomers. Exemplary oligomers include urethane oligomers and acrylate oligomers.

The coating-extender composition may be utilized in coating systems comprising from about 5% to about 70%, from about 10% to about 60%, or from about 20% to about 50% by weight of one or more polymer resins. The polymer resins may be acrylate resins, urethane resins, or combinations thereof.

The coating-extender composition may be utilized in coating systems comprising from about 5% to about 40%, from about 10% to about 35%, or from about 15% to about 30% by weight of one or more reactive diluents. Exemplary reactive diluents include vinylpyrrolidone, N-vinylcaprolactam, and combinations thereof.

The coating-extender composition may be utilized in UV-curable coating systems comprising from about 0.1% to about 15%, from about 0.5% to about 10%, or from about 1% to about 8% by weight of one or more photoinitiators. Exemplary photoinitiators include Exemplary photo-initiators suitable for use with the present invention include ITX (2-isopropylthiaoxantlone), Irgacure® 184 (1-benzoyl-1-hydroxycyclohexane), TPO (2,4,6-trimethylbenzoylphenyl-phosphineoxide), benzoin ethers such as benzoin isopropyl ether, benzyl dimethyl ketal (commercially available as Irgacure® 651 from Ciba-Geigy), 2-methyl-1-[4-(methylthio)phenyl]-2-(4-morpholinyl)-1-propanone (Irgacure® 907), 2-benzyl-2-(dimethylamino)-1-[4-(4-morpholinyl) phenyl]-1-butanone (Irgacure® 369), mono- and bis-acyl-phosphines such as Irgacure® 1700, Irgacure® 1800, Irgacure® 1850, Irgacure® 184, Darocur® 4265, and Darocur® 1173

The coating-extender composition may be utilized in coating systems comprising a pigment present at a level of from about 3% to about 40%, about 5% to about 30%, or about 10% to about 25% by weight.

As mentioned previously, the adhesion-promoting compounds used can often be reactive with water, which could cause undesirable and premature gelling of the ink composition. Surprisingly, though, it has been discovered that after being applied to the glass particles, the water-reactivity of the adhesion-promoting compound is reduced or eliminated. Therefore, the coating-extender composition may be suitable for use in coating systems that the adhesion-promoting compound would normally catalyze, such as aqueous or water-based coating systems. In certain embodiments, the coating systems prepared with the coating-extender composition can have a pot life of at least 3 months, at least 6 months, or at least 12 months from manufacture.

In certain embodiments, coatings comprising the coating-extender composition provide excellent adhesion to a variety of substrates including, but not limited to, polyester fibers, glass, metal, reflective sheeting, polycarbonate, PET, vinyl film, and nylon sheets.

In certain embodiments, ink formulations according to the present invention have excellent adhesion characteristics as determined by ASTM D3359-08 Standard Test Methods for Measuring Adhesion by Tape Test. Generally, this test method involves applying a layer of ink to a particular substrate, creating a lattice pattern of cuts in the cured ink, applying a pressure-sensitive tape over the lattice, and removing the lattice. Performance is then judged by how much, if any, of the ink was removed from the lattice by the tape. In particular embodiments according to the present invention, less than 5% of the ink is removed by the tape, and more preferably, none of the ink is removed by the tape. In this particular test, the ink is deposited on the substrate to form a film of at least 0.5 mil thickness. The substrate used in the adhesion test may vary from rigid plastic substrates like polyethylene, polycarbonate, corrugated polyethylene, flexible vinyl films such as those used for vehicle wraps, and metallic substrates.

In certain embodiments of the present invention, the coating compositions also exhibit excellent resistance to a variety of aggressive solvents and chemicals such as acetone, xylene, alcohols, paint thinners and acids. Specifically, the coating composition can be tested in accordance with ASTM D5402, incorporated by reference herein, and withstand at least 10 rubs with a cloth or wad of cotton soaked with acetone without showing visible signs of the coating being removed from the substrate. In particular embodiments, the coating compositions are capable of withstanding 50 acetone rubs.

In certain embodiments, the presence of the glass particles also imparts mar-resistance characteristics to the applied coating compositions. In certain embodiments, the substrate prepared as described above can also pass a Taber abrasion test of 3000 cycles using a 500-gram load CS 10 wheel with substantially no change in % haze or no appreciable weight loss

EXAMPLES

The following examples describe methods of forming a coating-extender composition comprising an adhesion-promoting compound and uses thereof in various coating systems. It should be understood that these examples are provided by way of illustration and should not be taken as limiting the scope of the present invention.

Example 1

The following example sets forth an exemplary extender and adhesion-promoter composition prepared in accordance with one embodiment of the present invention. It is to be understood, however, that this example is provided by way of illustration and nothing therein should be taken as a limitation upon the overall scope of the invention.

A mixture comprising 80 parts by weight ethyl alcohol and 20 parts by weight PZ-33 trifunctional polyaziridine, a XAMA 7 equivalent, available from PolyAziridine, LLC, Medord, N.J., was prepared. To this mixture was added 50 parts by weight of solid glass microspheres, SPHERI-GLASS 5000 by Potters Industries LLC, Valley Forge, Pa. After a thorough mixing, the mixture containing the glass microspheres was permitted to rest for a period of one hour. The mixture was then vacuum filtered using a 10 micron filter to remove excess alcohol and adhesion promoter. The glass microspheres were recovered and then spread out on a sheet of glass or polycarbonate and placed in an oven at 125° F. overnight (roughly between 12 to 20 hours) in order to evaporate most of the ethyl alcohol residues.

Example 2

In this example, the coating-extender composition from Example 1 is used in the formulation of an LED-curable ink composition. First, a varnish is prepared as described below. The varnish is then utilized in the formation of a yellow-pigmented ink composition. Ten percent (10%) of the varnish is replaced with the coating-extender composition from Example 1.

Varnish

| Component | Amount (wt. %) |
| --- | --- |
| Polyester-based polyurethane diacrylate oligomer (CN991 from Sartomer) | 23% |
| N-vinyl-2-pyrrolidone | 23% |
| Isobornyl acrylate | 19.7% |
| Tricyclodecane dimethanol diacrylate monomer (SR833S from Sartomer) | 15% |
| Stabilizer (Additive 99-775 from Rahn) | 1.3% |
| Chlorinated binder (LAROFLEX MP 15 from BASF) | 3% |
| Monofunctional acrylic monomer (CD420 from Sartomer) | 15% |

Yellow Ink

| Component | Amount (wt. %) |
| --- | --- |
| Varnish 1 | 44.25% |
| Coating Extender from Example 1 | 10% |
| Isobornyl acrylate | 15% |
| N-vinyl-2-pyrrolidone | 4% |
| 2,4,6-Trimethylbenzoyldiphenylphosphine oxide (TPO photoinitiator from CIBA/BASF) | 3% |
| IRGACURE 184 photoinitiator from CIBA/BASF | 3.5% |
| Ethyl-4(dimethylamino)benzoate (EDAB from Albermarle) | 4% |
| Isothioxanone (photoinitiator) | 2.75% |
| Yellow Pigment Dispersion (from Polymeric Imaging) | 9% |
| Polyether siloxane copolymer (surfactant) (TEGO 450 from TEGO CHEMIE/BASF) | 1% |
| Ethyl alcohol | 3% |
| Stabilizer (Additive 99-775 from Rahn) | 0.5% |

Example 3

In this example, a water-based ink is formulated using the coating-extender composition prepared in Example 1. Approximately 10% of the resins and pigment dispersion have been replaced with the coating-extender composition.

| Component | Amount (wt. %) |
| --- | --- |
| Deionized water | 19.15% |
| N-Methyl-2 Pyrrolidone (solvent) | 10% |
| Dibasic Ester (solvent) | 5% |
| NeoRez R-972 (aliphatic polyurethane resin) | 18% |
| Alberdingk LUX 2411 (aliphatic polyester polyurethane UV curable resin) | 18% |
| 1[4-(2-Hydroxyethoxy)-phenyl]-2-hydroxy-2-methyl-1-propane-1-one (photoinitiator, Irgacure 2959) | 3% |
| DeeFo123 (defoamer) | 0.5% |
| wetting and leveling surfactant (polyether modified polydimethylsiloxane, BYK 348) | 0.5% |
| wetting and leveling surfactant (ethoxylated nonionic fluorosurfactant, Zonyl FSO) | 0.5% |
| Tego Glide 482 (slip and scratch resistance additive) | 0.35% |
| Hostajet EPT Magenta (pigment dispersion) | 18% |
| Xama 7 (aziridine crosslinker) | 1% |
| Coating Extender from Example 1 | 16% |

Example 4

In this example, a UV-curable, thermoformable ink is formulated using the coating-extender composition prepared in Example 1. Ten percent (10%) of the acrylic solution has been replaced with the coating-extender composition.

Acrylic Solution

| Component | Amount (wt. %) |
| --- | --- |
| 2-Phenoxyethyl acrylate (M-8200, Sartomer) | 43.50% |
| Vinylcaprolactam | 37.50% |
| ST-I FIRSTCURE (polymerization inhibitor/stabilizer) | 1.50% |
| Acrylic resin (MB-2594, Dianal) | 17.50% |

Initiator Solution

| Component | Amount (wt. %) |
| --- | --- |
| Isobornyl acrylate | 62.70% |
| ST-I FIRSTCURE (polymerization inhibitor/stabilizer) | 0.70% |
| Isopropylthioxanthone (IXT, photoinitiator) | 8.60% |
| IRGACURE 369 (aminoketone, Ciba) | 6.00% |
| IRGACURE 184 (hydroketone, Ciba) | 10.00% |
| Ethyl-4-(dimethylamino)benzoate (Albermarle) | 12.00% |

Ink Formulation

| Component | Amount (wt. %) |
| --- | --- |
| Acrylic Solution | 29.83% |
| Initiator Solution | 30.37% |
| Vinylcaprolactam | 10.00% |
| Blue Dispersion (RJA Dispersions) | 18.00% |
| ST-I FIRSTCURE (polymerization inhibitor/stabilizer) | 0.80% |
| EBECRYL 381 (wetting agent, Cytec Industries) | 1.00% |
| Coating Extender from Example 1 | 10.00% |

I claim:

1. A coating-extender composition comprising a plurality of microsized glass particles having an average particle size of less than 500 microns and from 5% to about 50% by weight, based on the weight of the entire composition, of an adhesion-promoting compound adhered thereto.

2. The composition according to claim 1, wherein said adhesion promoting compound comprises an aziridine crosslinking agent.

3. The composition according to claim 2, wherein said adhesion promoting compound comprises pentaerythritol tris[3-(1-aziridinyl)propionate].

4. The composition according to claim 1, wherein said composition comprises from about from about 15% to about 25% by weight of said adhesion promoting compound.

5. The composition according to claim 1, wherein said glass particles have an average particle size of from about 1 to about 200 microns.

6. The composition according to claim 1, wherein said glass particles are in the form of glass flakes having an average flake thickness of less than 5 microns.

7. The composition according to claim 1, wherein said glass particles are in the form of microspheres.

8. The composition according to claim 1, wherein said glass particles comprise a surface pretreatment comprising a silane coupling agent.

9. The composition according to claim 8, wherein said silane coupling agent is selected from the group consisting of 3-aminopropyltriethoxy silane, vinyl trimethoxy silane, γ-glycidoxypropyltrimethoxy silane, methacryloxypropyltrimethoxy silane, and mixtures thereof.

10. A coating composition comprising the coating-extender composition according to claim 1.

11. The coating composition according to claim 10, wherein said coating-extender composition comprises from about 1% to about 20% by weight of said coating composition.

12. The coating composition according to claim 10, wherein said coating composition comprises at least one member selected from the group consisting of:
    (a) one or more monomers;
    (b) one or more oligomers;
    (c) one or more polymer resins;
    (d) one or more reactive diluents; and
    (e) one or more photoinitiators.

13. The coating composition according to claim 10, wherein said coating composition is an ink.

14. A method of forming a coating-extender composition comprising:
    (a) forming a mixture comprising a quantity of glass particles having an average particle size of less than 500 microns and an adhesion-promoting compound dispersed in an alcohol; and
    (b) heating said mixture to a temperature of from about 100° F. to about 150° F. for a period of time sufficient to evaporate at least a portion of said alcohol from said mixture to form said coating-extender composition comprising said glass particles and from 5% to about 50% by weight of said adhesion-promoting compound.

15. The method according to claim 14, wherein said mixture comprises from about 40% to about 65% by weight of said alcohol, from about 5% to about 30% by weight of said adhesion-promoting compound, and from about 20% to about 45% by weight of said glass particles.

16. The method according to claim 14, wherein said alcohol comprises ethyl alcohol.

17. The method according to claim 14, wherein said method comprises, prior to step (b), filtering said mixture so as to remove at least a portion of said alcohol therefrom.

18. The method according to claim 17, wherein said filtering occurs under vacuum conditions.

19. A method of forming a coating-extender composition comprising:
    (a) forming a mixture comprising a quantity of glass particles having an average particle size of less than 500 microns and an adhesion-promoting compound dispersed in an alcohol;
    (b) filtering said mixture so as to remove at least a portion of said alcohol therefrom; and
    (c) heating said mixture to a temperature of from about 100° F. to about 150° F. for a period of time sufficient to evaporate at least a portion of said alcohol from said mixture to form said coating-extender composition.

20. The method according to claim 19, wherein said filtering occurs under vacuum conditions.

21. A glass particle for use as an extender in an ink or coating composition and having an adhesion-promoting coating comprising:
    a microsized glass particle having a particle size of less than 500 microns;
    a pretreatment on the surface of said microsized glass particle comprising a silane coupling agent; and
    an adhesion-promoting compound adhered to the surface of said microsized glass particle by said silane coupling agent.

22. The glass particle of claim 21, comprising 5% to about 50% by weight of said adhesion-promoting compound.

* * * * *